United States Patent
Helland et al.

(10) Patent No.: US 8,318,841 B2
(45) Date of Patent: Nov. 27, 2012

(54) BINDER FOR AIR-DRYING PAINT COMPRISING NANOPARTICLE BONDED SILICON DERIVATIVE OF UNSATURATED FATTY ACID

(75) Inventors: Tina Helland, Sandefjord (NO); Olav Marstokk, Sandefjord (NO); Ferdinand Männle, Oslo (NO); Christian Simon, Oslo (NO); Yang Juan, Oslo (NO)

(73) Assignee: Sinvent AS, Trondheim (NO)

( * ) Notice: Subject to any disclaimer, the term of this patent is extended or adjusted under 35 U.S.C. 154(b) by 0 days.

(21) Appl. No.: 12/922,548

(22) PCT Filed: Mar. 13, 2009

(86) PCT No.: PCT/NO2009/000094
§ 371 (c)(1),
(2), (4) Date: Dec. 16, 2010

(87) PCT Pub. No.: WO2009/113876
PCT Pub. Date: Sep. 17, 2009

(65) Prior Publication Data
US 2011/0086967 A1   Apr. 14, 2011

(30) Foreign Application Priority Data
Mar. 14, 2008  (NO) .................................. 20081357

(51) Int. Cl.
*C08K 3/22*  (2006.01)
(52) U.S. Cl. ........ 524/403; 524/430; 524/431; 524/432; 524/492; 524/493; 524/497
(58) Field of Classification Search .................. 524/403, 524/430–432, 492–493, 497
See application file for complete search history.

(56) References Cited

U.S. PATENT DOCUMENTS

| | | | |
|---|---|---|---|
| 6,750,270 | B1 | 6/2004 | Klostrmann et al. |
| 2004/0204521 | A1 | 10/2004 | Camenzind et al. |
| 2007/0014917 | A1 | 1/2007 | Binnewies et al. |
| 2007/0196658 | A1 | 8/2007 | Briehn et al. |
| 2007/0298259 | A1 | 12/2007 | Matsumoto |
| 2008/0017071 | A1 | 1/2008 | Moebus et al. |
| 2009/0173253 | A1 | 7/2009 | Roesch et al. |
| 2010/0006005 | A1 | 1/2010 | Roesch et al. |

FOREIGN PATENT DOCUMENTS

| | | |
|---|---|---|
| CN | 1995084 A | 7/2007 |
| EP | 0384352 A2 | 8/1990 |
| EP | 1359182 A1 | 11/2003 |
| EP | 1361245 A1 | 11/2003 |
| EP | 1526115 A1 | 4/2005 |
| EP | 1448724 B1 | 1/2007 |
| WO | WO-03/044099 | 5/2003 |
| WO | WO-03080747 A1 | 10/2003 |
| WO | WO-2005/040294 A1 | 5/2005 |
| WO | WO-2005/100450 A1 | 10/2005 |
| WO | WO-2006/008120 A1 | 1/2006 |
| WO | WO-2006/045713 A1 | 5/2006 |
| WO | WO-2006/125736 A1 | 11/2006 |
| WO | WO-2007/020062 A2 | 2/2007 |
| WO | WO-2007/020063 A2 | 2/2007 |
| WO | WO-2007/053024 A1 | 5/2007 |
| WO | WO-2007/102741 A1 | 9/2007 |

OTHER PUBLICATIONS

PCT/ISA/210—International Search Report—Jul. 8, 2009.
Norwegian Official Action W/ Translation—Oct. 13, 2008.
PCT/ISA/237—Written Opinion of the International Searching Authority—Jul. 8, 2009.
C. Jeffrey Brinker et al.; Sol-Gel Science "The Physics and Chemistry of Sol-Gel Processing", 1990; pp. 1-908.

*Primary Examiner* — Peter Szekely
(74) *Attorney, Agent, or Firm* — Venable LLP; Eric J. Franklin

(57) ABSTRACT

A binder for air drying paint, based on metal oxide-containing nanoparticles with unsaturated organic branches. At least one metal atom of the nanoparticle is chemically bound to an organic branch with at least one unsaturated ethylenic functionality. A process for preparation of the binder.

24 Claims, 1 Drawing Sheet

Figure 1
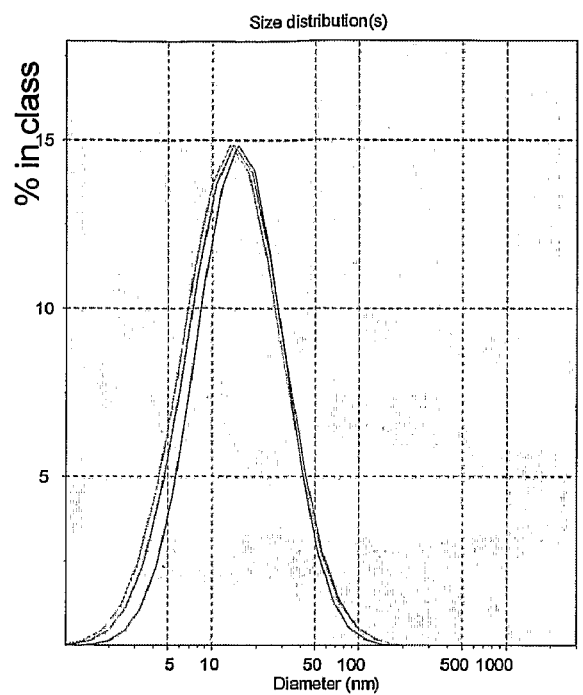
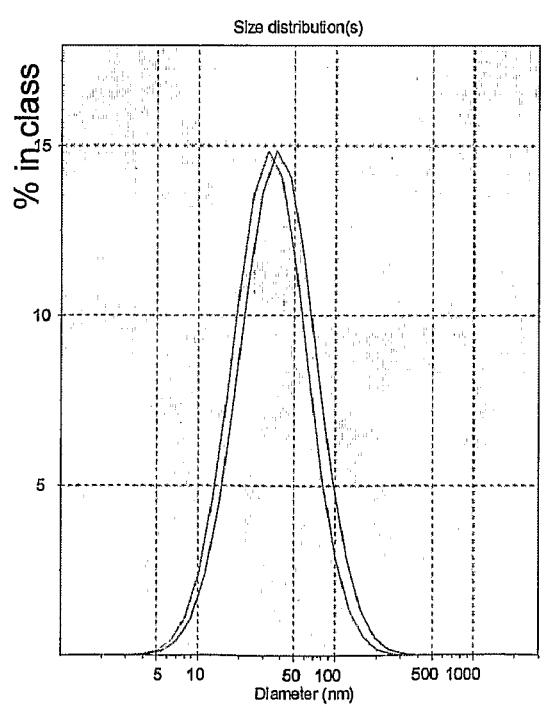
Figure 2

BINDER FOR AIR-DRYING PAINT COMPRISING NANOPARTICLE BONDED SILICON DERIVATIVE OF UNSATURATED FATTY ACID

CROSS-REFERENCE TO RELATED APPLICATIONS

This application claims priority under 35 U.S.C. §119 to Norwegian patent application 2008 1357 filed 14 Mar. 2008 and is the national phase under 35 U.S.C. §371 of PCT/NO2009/000094 filed 13 Mar. 2009.

Field of the Invention

The present invention relates to binder for air drying paint based on metal oxide-containing nanoparticles with unsaturated organic branches, a process for preparation thereof and air drying paint and lacquer containing the binder. Finally the invention relates to use of such air drying paint and lacquer.

BACKGROUND

Paint is a mixture of pigments, binders, extenders, additives and solvents. The paint should improve the appearance of and give protection to a substrate/base. The binder of the paint gives cohesion in the paint film and adhesion to the base. Fatty acid modified polyester, alkyd, is often used as binder in paint and lacquer. The air drying binder cures by reaction with oxygen in the air, where the double bonds from the fatty acids are the reaction point of the cross-binding reaction. Alkyd technology has some advantages and disadvantages compared to other binder technology:

- The raw materials largely come from renewable sources.
- The raw materials are relatively cheap.
- Alkyd paint is easy to use, since it is a 1-component paint.
- Relatively good technical properties such as scratch resistance, flexibility and wetting of the substrate. The scratch resistance is however not as good as for a 2-component paint and lacquer.
- Alkyd paint dries relatively slowly compared to other types of paint technologies. In the curing phase the paint film is vulnerable for capture of dirt, as it is then sticky. This phase is longer for alkyd paints than for other types of paint.
- The technology is available for water dilutable as well as solvent dilutable systems.
- Alkyd paint is vulnerable to UV-degradation.

EU has come with a VOC directive (Volatile Organic Compounds). This directive gives restrictions to how much organic solvent can be used in paint. The directive gives requirements in two steps, where the first is in force from 2007 and the second from 2010. In some categories, the requirement from 2010 is particularly demanding. Solvent diluted alkyd paint is encompassed with a requirement of maximum 300 g VOC per liter paint. In order to satisfy these new requirements, the paints must be reformulated. One option is to use a new binder so that the paint may be diluted with less solvent, without significantly increasing the viscosity. If such a reformulation is done without any other measures, the properties of traditional alkyd paints are dramatically changed, to the worse. In particular the curing time is considerably extended. For outdoors protection of wooden materials, solvent diluted alkyd paints are typically much used in Norway. A change to exclusively water dilutable systems is difficult in Norway, due to the climate. Thus, it is important to come up with technically good solutions for this type of technology.

Much work has been done in order to improve the alkyd technology, in particular with the aim to improve the UV-resistance, achieve faster curing time and a harder and more scratch resistant paint film. A part may be gained by the proper choice of monomers to the alkyd, some more may be gained by a good polymerisation process. Larger improvements require the preparation of an alkyd hybrid. This implies combining alkyd technology with other binder technologies. It may be relevant with a chemical modification of the alkyd polymer, most often a graft-copolymer. The most common chemical compounds used for this purpose are: poly(meth)acryl, silicone/siloxane or polyurethane. This improves the alkyd technology rather much, improvements which would not possibly be achieved without combining different technologies. Even though these chemical modifications are made, it is still a 1-component air drying system. The price of the new hybrids will be higher due to more expensive raw materials and more complicated processes. At least one extra production step must be accounted for.

Another possible method for improving alkyd paints is to mix in inorganic nanoparticles. First and foremost, the nanoparticles contribute to increased hardness and improved scratch resistance. It is assumed that the hardness of the particles themselves contribute to this. Today, paint consists much of fillers and pigments, which are mineralic. They are large, that is, the particle diameter is from 200 nm-500 μm. Typically, nanoparticles used in paint and lacquer have diameters from 10 nm-60 nm. They are in a completely different range of sizes, where the surface area of the particles gets very large in relation to the particle volume. This implies that nanoparticles may contribute to a completely different improvement, than what is achieved when admixing regular pigment particles even though the chemistry may be quite similar. The surface of the paint film gets smoother with nanoparticles, a smooth surface is beneficial in order to have better scratch resistance. The nanoparticles do not scatter the light so that the optical properties of the paint are not altered. The smaller particles, the larger surface and this is favourable in order to make a dense and hard film. The interaction between polymer and particle gets better.

Many nanoparticles for paint and lacquer have come to the market, for both water diluted and solvent diluted systems. The inorganic particle is hard and contributes to improved mechanical properties of the product. It has been found that the surface of the particles must be modified in order to improve the mixability with the binder. If this is not done, one may get problems with the storage stability or surface disturbances on the paint film. At best, only a neglectable improvement is achieved.

One method for preparation of surface modified nanoparticles is to react an already existing particle with a coupling reagent as disclosed in WO2006045713, WO2006125736 and US20040204521. The existing particles may be commercially available particles with size up to 1000 nm. The coupling reagent being used here, is an organic silicon compound with at least one alkoxy functionality. Selected chemical compounds may be chemically bound towards the coupling reagent before or after the coupling towards the nanoparticle. In this way, the surface modified nanoparticle may get additional functionality such as radical capturer, antioxidiser, UV-absorber, light stabiliser, flame retardant, photo initiator or combinations of these. The particles to be modified may be commercially available particles of $SiO_2$ and $Al_2O_3$ or mixtures of these metal oxides. The use of such modified particles in thermoplastics, thermoset plastics, paint and lacquer is mentioned. Binder for air drying paint based on such surface modified nanoparticles is not disclosed.

WO2007020062 and WO2007020063 reports surface modification of existing metal oxide particles by using silane as coupling reagent. It is claimed protected a process which does not originate from a sol-gel synthesis, but which is based on dispersing particle agglomerates in an organic solvent. The aerosil-process or precipitation from solution may be processes for preparation of agglomerates of such nanoparticles. Immediately after dispersing, the particles are reacted with a silane-coupling reagent. Use of these particles in paint and lacquer is also reported, in particular, for increasing scratch resistance in fully hardened lacquer or paint. Binder for air drying paint based on such de-agglomerated and surface modified nanoparticles is not disclosed.

EP1526115 and US2007014917 reports preparation of organically modified nanoparticles in a sol-gel-process based on silicon tetrachloride, $SiCl_4$. Remaining Si—Cl-groups may be reacted with R—OH, $RNH_2$, $R_2NH$, $RPH_2$, $R_2PH$, R—Mg—X, Li—R, where X is a halogen atom and R an organic residue or a silicon organic group. Modification giving particles with instauration or epoxy functionality in the R-group is mentioned, and use in paint and lacquer is reported. Binder for air drying paint based on surface modified nanoparticles is not disclosed.

EP1361245 and EP1359182 discloses amine functional polysiloxanes which may be used in epoxy systems. Paint/lacquer with improved hardness, better shine resistance and weatherability may be achieved. The disclosed polysiloxanes has a linear and not a particulate structure. Hence they may not be denoted as nanoparticles. Use of such siloxanes as binder for air drying paint is not reported.

In WO2006008120 it is disclosed water based dispersions of inorganic nanoparticles where the nanoparticles are surrounded by pure organic polymers. The organic polymers are often used in coatings, also without nanoparticles. It is reported use of the nanoparticles which are surrounded by pure organic polymers in air drying coating. However, the organic polymers are not bound towards the inorganic nanoparticle with a covalent chemical bond. Therefore, such nanoparticles which are surrounded by pure organic polymers, must be regarded as a physical mixture, and not as a hybrid matter where organic branches are chemically bound towards inorganic particles.

In US 2008/0017071 it is disclosed water based binder dispersions comprising three components: a) binders known per se, such as saturated or unsaturated polyester, polyurethane, alkyd resin, phenol resin, urea resin and melamine resin, b) inorganic nanoparticles, c) polymer particles of nano size. Component c) is present dispersed in water, and it covers component b). In order to improve the contact between component b) and c), the surface of the inorganic nanoparticles (component b), may be modified with suitable organic compounds. It is not disclosed how component c), when it covers component b), may be used as binder for air drying paint. Component c), when it covers component b), must for this be air drying per se.

In U.S. Pat. No. 6,750,270 it is disclosed a binder where nanoparticles and a binder known per se carries complementary reactive groups which may react chemically with each other during the preparation of the new binder. It is not mentioned or disclosed uses where the known binder per se is air drying. It is also not mentioned or disclosed that the new binder may be used as binder for air drying paint.

WO2005100450 discloses a process for preparation of different types of polybranched inorganic/organic hybrid polymers. The process is based on a chemical reaction between one amine group in a polybranched inorganic/organic hybrid polymer and one suitable mono functional chemical compound. It is disclosed one type of water dilutable inorganic/organic hybrid polymer with cross-binding acryl groups. Water-containing solutions or dispersions of this type of hybrid polymer are obviously alkaline due to its chemical construction as polyamine, and thereby poorly suitable as binder for air drying paint.

WO2007053024 discloses a process for preparation of polybranched inorganic/organic hybrid polymer with UV-absorbing properties. Use as UV-absorbing component in binder-, lacquer- and coating products is reported. On the other hand this type of polybranched inorganic/organic hybrid polymer is very poorly suitable as binder for air drying paint.

Purpose

It is a purpose of the present invention to provide binders for air drying paint which may impart short drying times to the paint, and at the same time low viscosity at low content of VOC.

Further it is a purpose to provide processes for preparation of binders as given above.

Further it is a purpose to provide air drying paint or lacquer, comprising binders as given above.

The Invention

The present invention provides a binder for air drying paint, based on metal oxide-containing nanoparticles with unsaturated organic branches, where at least one metal atom of the nanoparticle is chemically bound to an organic branch with at least one unsaturated ethylenic functionality.

A second aspect of the invention is a process for preparation of binder according to the invention, where it in a first step, is prepared a polybranched organic/inorganic hybrid polymer of hydrolysable metal compounds with functional amine groups. This reaction is carried out by controlled hydrolysis and condensation after water is mixed with the hydrolysable metal compounds (Sol-Gel Science: The Physics and Chemistry of Sol-Gel Processing. C. Jeffrey Brinker and Geirge W. Scherer, Academic Press Inc., New York, 1990). Such a process is often referred to as a sol-gel process. The process comprises at least one further process step, in which one or more of said functional amine groups is/are reacted with at least one unsaturated organic compound, so that it is formed a covalent chemical bond or ionic bond between the N-atom of the functional amine group and at least one atom of the unsaturated organic compound.

A third aspect of the invention is air drying paint or lacquer containing at least one binder according to the invention.

A nanoparticle may be defined as a solid particle having a size between 1 nm and 100 nm.

The quality of a binder for air drying paint is, among others, dependant on the number of cross-binding groups being linked together on a chemical base-structure. The number of cross-binding groups in a binder is in the following denoted with $f_{kryss}$. Generally seen, a binder with larger $f_{kryss}$ will form a better cross-bonded network, show more wear- and weather resistance and dry faster than a comparable binder with smaller $f_{kryss}$. At the same time, the molar weight of the binder is normally larger if $f_{kryss}$ is larger. This may imply undesirably high viscosity and/or undesirably extensive use of solvents and thereby VOC.

One possibility in order to achieve large $f_{kryss}$ with low contribution to viscosity is to prepare binders with a compact structure, based on a core of metal oxide with cross-binding organic branches. Such binders may be denoted as "inorganic/organic hybrid binders" or quite simply "hybrid binders" because they consist of an inorganic core (metal oxide) and organic branches on the surface. Due to their particulate nature they may also be denoted as nanobinder.

BRIEF DESCRIPTION OF THE DRAWINGS

FIG. 1 represents a graph illustrating a distribution of particle sizes in an example of a binder dispersion; and FIG. 2 represents a graph illustrating a distribution of particle sizes in another example of a binder dispersion.

CLOSER REGARDING THE INVENTION/PREFERRED EMBODIMENTS

With preferred embodiments according to the first aspect of the invention, are hybrid binders where the cross-binding organic branches are linked towards the metal oxide core with a hydrolysis-stable covalent chemical bond. An example of a chemical structure with a hydrolysis-stable covalent chemical bond is $O_{1.5}Si—CH_2—R$, where the link between the metal oxide core and the organic branch reside in the $Si—CH_2$-bond. The R-group contains the cross-binding chemical group. In addition the R-group may contain other comparably hydrolysis-stable covalent chemical bonds such as, for example, amide bonds. It is known, that the hydrolysis of amide bonds under comparable conditions occurs considerably slower than the hydrolysis of ester bonds.

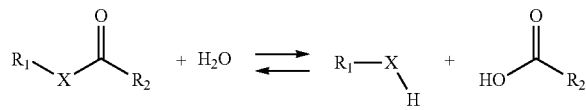

The hydrolysis runs faster for X=O than for X=N—H. In this invention, covalent chemical bonds are denoted as hydrolysis-stable if the hydrolysis under comparable conditions, run slower than the hydrolysis of ester bonds. Examples of such hydrolysis-stable covalent chemical bonds are

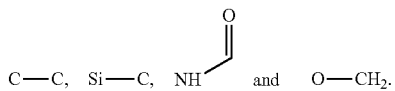

Examples of covalent chemical bonds which are not hydrolysis-stable in accordance with the designation of this invention are

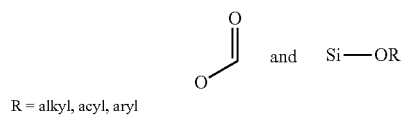

R = alkyl, acyl, aryl

In $O_{1.5}Si—CH_2—R$ the oxygen atoms of the $O_{1.5}Si—$ part are attached to metal atoms so that each oxygen atom is attached to the silicon atom and one metal atom. Thereby the index of O in $O_{1.5}Si—CH_2—R$ is calculated to 1.5.

Due to the cost efficiency, it is preferred that R-groups of $O_{1.5}Si—CH_2—R$ are based on unsaturated fatty acids. One example is

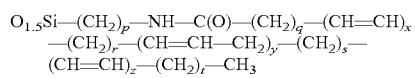

where p is an integer from 1-24
q, r, s, t are an integer from 0-21
x, z are an integer from 0-4
y is an integer from 0-6

According to the invention, it is preferred that the metal in the metal oxide core for binders may be chosen among, but not limited to, Si, Al, Zr, Ce, Zn, Sn, Fe and Ti.

According to the second aspect of the invention, hybrid binders may be prepared by the following process:

In a first step, it is produced a polybranched organic/inorganic hybrid polymer when hydrolysable metal compounds with functional amine groups are reacted through hydrolysis and condensation. In at least one further process step one or more of said functional amine groups are reacted with at least one unsaturated organic compound so that it is formed a covalent chemical bond or a ionic bond between the N-atom of the functional amine group and at least one atom of the unsaturated organic compound.

It is preferred, that the unsaturated organic compound is chosen among unsaturated fatty acids and derivatives of unsaturated fatty acids. Examples are: soya fatty acid, sunflower fatty acid, cotton seed fatty acid, conjugated fatty acid, linoil fatty acid, rape fatty acid, caster oil fatty acid, tall oil fatty acid, coco fatty acid, fish fatty acid, palm kernel fatty acid, safflower fatty acid, eleostearic fatty acid, peanut oil fatty acid, methyl linoleate and other ester derivatives of said fatty acids.

In the above process for preparation of binders in accordance with the invention, it is preferred that the hydrolysable metal compound with functional amine groups is chosen among 3-amine propyl triethoxy silane and 3-amine propyl trimethoxy silane.

The process may also comprise hydrolysable metal compounds without functional amine groups, in addition to hydrolysable metal compounds with functional amine groups.

It is preferred that hydrolysable metal compounds without functional amine groups are chosen among alkoxides and carboxylates of silicon, aluminum, titanium and zirconium.

Further it is preferred that the overall process comprises at least one silane with the following composition:

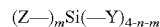

where n is an integer from 0 to 2
m is an integer from 1 to 3
Y is chosen among alkoxy, carboxyl and halogen
Z is chosen among hydrogen, alkyl, aryl, substituted alkyl and substituted aryl. The silane may be chosen among, but not limited to, the compounds of table 1.

TABLE 1

| | |
|---|---|
| Methyl dimethoxy silane | 16811-77-9 |
| Methyl diethoxy silane | 2031-62-1 |
| Methyl trimethoxy silane | 1185-55-3 |
| Methyl triethoxy silane | 2031-67-6 |
| Methyl tripropoxy silane | |
| Methyl tributoxy silane | |
| Dimethyl ethoxy silane | 14857-34-2 |
| Dimethyl dimethoxy silane | 1112-39-6 |
| Dimethyl diethoxy silane | 78-62-6 |
| Trimethyl fluoro silane | 420-56-4 |
| Trimethyl bromo silane | 2857-97-8 |
| Trimethyl silyliodide | 16029-98-4 |
| Trimethyl silanol ks | 16029-98-4 |
| Dodecyl trimethoxy silane | 3069-21-4 |
| Dodecyl methyl dimethoxy silane | |
| Octodecyl trimethoxy silane | 3069-42-9 |
| Octodecyl triethoxy silane | 7399-00-0 |
| Octodecyl methyl dimethoxy silane | 70851-50-2 |

TABLE 1-continued

| | |
|---|---|
| n-Octyl trimethoxy silane | 3069-40-7 |
| n-Octyl triethoxy silane | 2943-75-1 |
| Octyl methyl diethoxy silane | 2652-38-2 |
| Propyl trimethoxy silan | 1067-25-0 |
| n-Butyl trimethoxy silane | 1067-57-8 |
| n-Butyl triethoxy silane | |
| i-Butyl trimethoxy silane | 18395-30-7 |
| i-Butyl triethoxy silane | 17980-47-1 |
| Phenyl trimethoxy silane | 2996-92-1 |
| Phenyl triethoxy silane | 780-69-8 |
| Phenyl trichloro silane | 98-13-5 |
| Diphenyl dimethoxy silane | 6843-66-9 |
| Diphenyl diethoxy silane | 2553-19-7 |
| Triphenyl chloro silane | 76-86-8 |

The process in accordance with the second aspect of the invention, may comprise a reaction with organic compounds chosen among anhydrides, epoxy compounds, esters, saturated organic acids, sulphonic acids and hydroxy acids.

Particularly preferred is the reaction with cyclic anhydrides. These may be chosen among, but not limited to, phthalic anhydride, maleic anhydride, succinic anhydride. The reaction may lead to imides or amides, since the N-atom comes from a functional amine group of a hydrolysable metal compound:

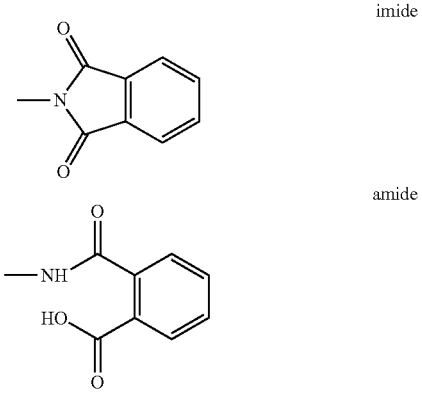

Amide structures being the result of such reactions may be deprotonated and thereby ionised with suitable bases or alkaline compounds:

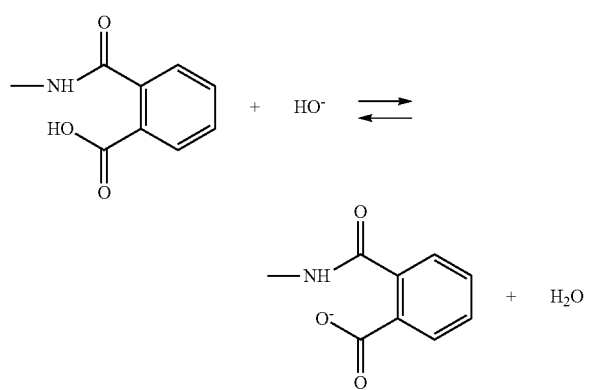

Ionised amide structures increase the solubility or dispersability of the binder in water. It is also preferred that the binder is soluble or dispersible in solvents chosen among, but not limited to, saturated and unsaturated hydrocarbons, aromatics and mixtures of these.

The process in accordance with the second aspect of the invention, may comprise a reaction with an organic compound with at least one functional acid group chosen among, but not limited to, carboxylic acid groups and sulphonic acid groups, since the functional acid group before or after the reaction may be deprotonated and thereby ionised with suitable bases or alkaline compounds. The covalent chemical bond or the ionic bond, between the N-atom of the functional amine group and at least one atom of the organic compound being formed in the overall process, does in such a case normally not comprise the carbon atom of the functional carboxylic acid group or the sulphur atom of the sulphonic acid group.

It is preferred that the organic compound is trimellitic anhydride.

Further it is preferred, that the binder is soluble or dispersible in water.

The process in accordance with the second aspect of the invention may be carried out in presence of particles chosen among, but not limited to, metal oxide particles, organic pigments and fillers, which in themselves not, or to a small extent, form a hydrolysis-stable product with the unsaturated organic compound or compounds. The binder being prepared in the overall process may also be mixed with particles chosen among, but not limited to, metal oxide particles, organic pigments and fillers, by the use of industrial mixing processes. Particles to be used in the overall process or the mixing process, may have a diameter between 5 nm and 1000 nm.

It is particularly preferred, that the metal oxide particles are chosen among silicon oxide, aluminum oxide, titanium oxide, zirconium oxide and iron oxide.

The third aspect of the invention, relates to air drying paint or lacquer containing at least one hybrid binder as disclosed above.

Due to the cost efficiency, it is also important that hybrid binders may be mixed with cheap organic binders, such as, for example alkyd based binders. In the mixture, the hybrid binder constitutes 1-100 weight-% of the binders, most preferred 3-40 weight-%.

Air drying paint based on hybrid binders alone or together with other organic binders, may combine several important properties such as
 rapid curing due to high $f_{kryss}$ on at least parts of the binders
 good wear properties and weather resistance due to hydrolysis-stable covalent chemical bonds between metal oxide particles and organic network
 low viscosity due to the compact structure of the hybrid binders
 fatty acid based and thereby cost efficient.

Paint and lacquer where the binder, at least in part, is a hybrid binder, may upon drying form a homogenous film where inorganic metal oxide particles are chemically bound to an organic matrix. This contributes to faster curing and harder surface of dried paint and lacquer.

The third aspect of the invention therefore also relates to air drying paint or lacquer, which in addition to at least one hybrid binder, contains one or more other binders. Such binders may be chosen among, but not limited to, alkyd, fatty acid modified polyester, fatty acid modified polyurethane, urethane modified alkyd, linoil, allylfunctional acryl, fatty acid modified acryl or other drying oils.

Particularly preferred are binders chosen among alkyd, fatty acid modified polyester, fatty acid modified polyurethane and linseed oil.

Further preferred is air drying paint or lacquer in accordance with the invention, containing less than 300 grams per liter of volatile organic compounds (VOC).

Further preferred is air drying paint or lacquer in accordance with the invention, which before the drying has a cone and plate-viscosity <3.5 P and after 24 hours of drying in air, at less than 25° C., has König-pendulum-hardness ≧6 swings.

Preferred is also air drying paint or lacquer in accordance with the invention, containing 1-90 weight-% binder, most preferred 30-80 weight-%.

Binders in accordance with the invention are preferably used for air drying paint or lacquer which is chosen among polyamide thixotropic alkyd paint and polyurethane thixotropic alkyd paint.

Air drying paint or lacquer containing at least one hybrid binder as disclosed above may be applied to a substrate, dried and form a film on the substrate.

Suitable substrates may be 2- or 3-dimensional objects based on materials which are chosen among but not limited to wood, metal, thermoplastic, thermoset plastic, ceramic and combinations of these.

The invention is illustrated by the following examples.

EXAMPLE 1

Preparation of Polybranched Organic/Inorganic Hybrid Polymer with Si-core

A polybranched organic/inorganic hybrid polymer is prepared according to the following method
a) Butyl glycol (294.5 g), water (130.69 g) and 2,2,6,6-tetramethyl piperidine (1.50 g) are weighed in a 2-liter flask. The mixture is stirred under inert atmosphere. Heated to 80° C. and the pressure reduced to 800 mbar. Dosing of amine propyl triethoxy silane (1004.45 g) is started at 80° C. When all amine propyl triethoxy silane has been added (20 min), the mixture is run with good stirring and reflux for 45 min.
b) The thermostat is set to 160° C. The distillation products are distilled off, where the pressure is reduced as required. The distillation is terminated at 160° C. and less than 1 drop distillate per second (20-50 mbar).

EXAMPLE 2

Air Drying Nanobinder Based on Si-core in Alkyd Paint
a) Preparation of Air Drying Binder with Si-core. With Soya Fatty Acid and Acetic Anhydride.

Polybranched organic/inorganic hybrid polymer, as given in example 1, is loaded in a ½-liter round flask (85.28 g). This is dissolved in xylene and ethanol in ratio 1:1 (dry matter 61%). Xylene (141.25 g) and soya fatty acid (46.70 g) are loaded. The mixture is heated under good stirring (200 rpm) and inert atmosphere ($N_2$). Ethanol is distilled off before water trap is filled with xylene. The mixture is heated to 140-145° C. The condensation product water is drained off and xylene recirculated to the round flask during the process. At an acid number of 10 mg KOH/g resin, the batch is cooled to under distillation temperature and acetic anhydride (27.77 g) is carefully loaded. The mixture is again heated to 140-145° C. At amine number 2-5 mg KOH/g resin, a vacuum (100-150 mbar) is applied with extra cooling trap, where residual water and xylene are removed. The final product is diluted in white spirit high flash (79.0 g). The final acid number is 14 mg KOH/g resin.

b) Achieved Paint Properties for Nanobinder Prepared in Example 2

Alkyd resin (26.48 g), white spirit high flash (17.88 g) and Ca-drier (2.4 g) are mixed and set stirring on dissolver. Titanium dioxide (81.36 g), filler (calcium carbonate, 58.68 g) and Bentone (2.04 g) are added to the mixture. Grind the mixture for 10-20 min.

The stirring velocity is reduced, and the following are then loaded: Alkyd resin (134.56 g), the product from pt 2a) (57.11 g), cobalt drier 10% (1.28), Zr-drier 18% (1.40 g), white spirit high flash (75.17 g) and antiskinning agent (1.64 g).

Reference paint is prepared in the same way, where the product from pt 2a) is substituted with alkyd resin, corrected for dry matter.

The paints are applied to glass plates for test of König pendulum hardness tests (100 μm wet film thickness).

The following results are achieved [number of swings]:

TABLE 2

| Paint | König Pendulum 24 hours | König Pendulum 96 hours | König Pendulum 168 hours | König Pendulum 336 hours |
|---|---|---|---|---|
| Ex. 2b | 6 | 8 | 10 | 12 |
| Ref. | 5 | 5 | 6 | 7 |

Larger number indicates increased hardness and faster curing of paint film.

EXAMPLE 3

Air Drying Nanobinder Based on Si-core in Alkyd Paint
a) Preparation of Air Drying Binder with Si-core. With Soya Fatty Acid and Methyl Benzoate.

Polybranched organic/inorganic hybrid polymer, as given in example 1, is loaded in a ½-liter round flask (64.96 g). This is dissolved in xylene and ethanol in ratio 1:1 (dry matter 59%). Xylene (163.94 g) and soya fatty acid (84.73 g) are loaded. The mixture is heated under good stirring (200 rpm) and inert atmosphere ($N_2$). Ethanol is distilled off before water trap is filled with xylene. The mixture is heated to 140-145° C. The condensation product water is drained off and xylene recirculated to the round flask during the process. At an acid number of 10 mg KOH/g resin, the batch is cooled to under distillation temperature and methyl benzoate (3.43 g) and butyl glycol (18.22 g) is carefully loaded. The reaction mixture is heated to 145-150° C. At amine number 2-5 mg KOH/g resin, a vacuum (100-150 mbar) is applied, where residual water, xylene and butyl glycol are removed. The final product is diluted in white spirit high flash (79.0 g). The final acid number is 9 mg KOH/g resin.
b) Achieved Paint Properties for Nanobinder Prepared in Example 3

Alkyd resin (26.48 g), white spirit high flash (17.88 g) and Ca-drier (2.4 g) are mixed and set stirring on dissolver. Titanium dioxide (81.36 g), filler (calcium carbonate, 58.68 g) and Bentone (2.04 g) are added to the mixture. Grind the mixture for 10-20 min.

The stirring velocity is reduced, and the following are then loaded: Alkyd resin (134.56 g), the product from pt 3a) (52.98 g), cobalt drier 10% (1.28), Zr-drier 18% (1.40 g), white spirit high flash (79.30 g) and antiskinning agent (1.64 g).

Reference paint is prepared in the same way, where the product from pt 3a) is substituted with alkyd resin, corrected for dry matter.

The paints are applied to glass plates for test of Beck-Koller drying (120 μm wet film thickness) and König pendulum hardness tests (100 μm wet film thickness).

The following results are achieved:

TABLE 3

| Paint | Beck-Koller T1 [h] | Beck-Koller T2 [h] | Beck-Koller T3 [h] | Beck-Koller T4 [h] | König Pendulum 24 hours | König Pendulum 96 hours | König Pendulum 168 hours | König Pendulum 336 hours |
|---|---|---|---|---|---|---|---|---|
| Ex. 3a | 2 | 7 | 13 | 30 | 8 | 10 | 11 | 12 |
| Ref. | 3 | 11 | 17 | 29 | 5 | 5 | 6 | 7 |

Beck-Koller gives drying time. Lower number indicates faster curing of the paint film.

EXAMPLE 4

Determination of Molecular Weight and Paint Properties for Air Drying Nanobinder Based on Si-core a) Preparation of Air Drying Binder with Si-core. With Soya Fatty Acid and Phthalic Anhydride (FSA)

Polybranched organic/inorganic hybrid polymer, as given in example 1, is loaded in a ½-liter round flask (85.41 g). This is dissolved in xylene (50%). Xylene (99.65 g) and soya fatty acid (94.91 g) are loaded. The mixture is heated under good stirring (200 rpm) and inert atmosphere ($N_2$). The mixture is heated to 140-145° C. The condensation product water is drained off and xylene recirculated to the round flask during the process. At an acid number of 10 mg KOH/g resin, the batch is cooled to under distillation temperature and FSA (5.12 g) is carefully loaded. The mixture is again heated to 140-145° C. At amine number 2-5 mg KOH/g resin, a vacuum (100-150 mbar) is applied, where residual water and xylene are removed. The final product is diluted in white spirit high flash (94.91 g). The final acid number is 12 mg KOH/g resin.

b) Determination of Molecular Weight

The binder disclosed in pt a) was diluted in THF (0.1 wt % solution) and measured on styragel columns, 4E and 5E in series. The following molecular weights were found:

TABLE 4

| Molecular weight | Mp | Mn | Mw | Mz | Mz + 1 | PD |
|---|---|---|---|---|---|---|
| Ex. 4a | 17278 | 7878 | 16409 | 21616 | 25970 | 2.082889 |
| Alkyd resin | 1066 | 1221 | 2562 | 6975 | 15366 | 2.098280 | c) Achieved Paint Properties for Nanobinder Prepared in Example 4a

Alkyd resin (26.48 g), white spirit high flash (17.88 g) and Ca-drier (2.4 g) are mixed and set stirring on dissolver. Titanium dioxide (81.36 g), filler (calcium carbonate, 58.68 g) and Bentone (2.04 g) are added to the mixture. Grind the mixture for 10-20 min.

The stirring velocity is reduced, and the following are then loaded: Alkyd resin (69.04 g), the product from pt 4b) (175.91 g), cobalt drier 10% (1.28), Zr-drier 18% (1.40 g), white spirit high flash (21.90 g) and antiskinning agent (1.64 g).

Reference paint is prepared in the same way, where the product from pt. 4b) is substituted with alkyd resin, corrected for dry matter.

The paints are applied to glass plates for test of Beck-Koller drying (120 μm wet film thickness) and König pendulum hardness tests (100 μm wet film thickness).

The following results are achieved:

TABLE 5

| Paint | Beck-Koller T1 [h] | Beck-Koller T2 [h] | Beck-Koller T1 [h] | Beck-Koller T2 [h] | König Pendulum 24 hours | König Pendulum 72 hours | König Pendulum 168 hours | König Pendulum 336 hours |
|---|---|---|---|---|---|---|---|---|
| Ex. 4 | 1.5 | 2.5 | 3.5 | 5 | 20 | 22 | 24 | 24 |
| Ref. | 1.5 | 4.5 | 11 | >24 | 7 | 9 | 10 | 11 |

EXAMPLE 5

Air Drying Nanobinder Based on Si-core in Alkyd Paint a) Preparation of Air Drying Binder with Si-core. With Soya Fatty Acid and Methyl Linoleate.

Polybranched organic/inorganic hybrid polymer, as given in example 1, is loaded in a ½-liter round flask (82.29 g). This is dissolved in xylene (50%). Xylene (96.01 g) and soya fatty acid (91.43 g) are loaded. The mixture is heated under good stirring (200 rpm) and inert atmosphere ($N_2$). The mixture is heated to 140-145° C. The condensation product water is drained off and xylene recirculated to the round flask during the process. At an acid number of 10 mg KOH/g resin, the batch is cooled to under distillation temperature and methyl linoleate (18.84 g) is carefully loaded. The mixture is heated again to 140-145° C. At amine number 2-5 mg KOH/g resin, a vacuum (100-150 mbar) is applied, where residual water and xylene are removed. The final product is diluted in white spirit high flash (91.43 g). The final acid number is 6 mg KOH/g resin.

b) Achieved Paint Properties for Nanobinder Prepared in Example 5a

Alkyd resin (26.48 g), white spirit high flash (17.88 g) and Ca-drier (2.4 g) are mixed and set stirring on dissolver. Titanium dioxide (81.36 g), filler (calcium carbonate, 58.68 g) and Bentone SD (2.04 g) are added to the mixture. Grind the mixture for 10-20 min.

The stirring velocity is reduced, and the following are then loaded: Alkyd resin (69.04 g), the product from pt 5a) (133.78 g), cobalt drier 10% (1.28), Zr-drier 18% (1.40 g), white spirit high flash (64.03 g) and antiskinning agent (1.64 g).

Reference paint is prepared in the same way, where the product from pt 5a) is substituted with alkyd resin, corrected for dry matter.

The paints are applied to glass plates for test of Beck-Koller drying (120 μm wet film thickness) and König pendulum hardness tests (100 μm wet film thickness).

The following results are achieved:

TABLE 6

| Paint | Beck-Koller T1 [h] | Beck-Koller T2 [h] | Beck-Koller T1 [h] | Beck-Koller T2 [h] | König Pendulum 24 hours | König Pendulum 72 hours | König Pendulum 168 hours | König Pendulum 336 hours |
|---|---|---|---|---|---|---|---|---|
| Ex. 5 | 1.5 | 2.5 | 3.5 | 7 | 18 | 19 | 18 | 18 |
| Ref. | 1.5 | 4.5 | 11 | >24 | 7 | 9 | 10 | 11 |

EXAMPLE 6

NMR-Runs for Air Drying Nanobinder Based on Si-core
a) Preparation of Air Drying Binder with Si-core. With Sunflower Fatty Acid Polybranched organic/inorganic hybrid polymer, as given in example 1, is loaded in a ½-liter round flask (42.35 g). Xylene (141.18 g) and sunflower fatty acid (98.82 g) are loaded. Water trap is filled with xylene. The mixture is heated to 140-150° C. under good stirring (200 rpm) and inert atmosphere ($N_2$). The condensation product water is drained off and xylene recirculated to the round flask during the process. At an acid number of 10 mg KOH/g resin, a vacuum (100-150 mbar) is applied, where residual water and xylene are removed. The final product is diluted in white spirit high flash (37.65 g). The final acid number is 8 mg KOH/g resin.

b) 80-100 mg of the sample was added 0.7 ml C6D6. The samples were shaken until they were homogenous. NMR-spectres of $^1H$ were run.

It was found amide bonds in the nanobinder. This originates from amidation of amine with fatty acid. The carboxylic acid peak in the fatty acid disappears after amidation, when it is consumed in the reaction. The double bonds of the fatty acid are intact after amidation. A review of spectra is given in table 6.

TABLE 7

Review of the H-spectra

| ppm | Area binder Ex. 6 | Area sunflower fatty acid | Spectrum | Comment |
|---|---|---|---|---|
| 11-12 |  | 0.9 | $^1H$ | COOH |
| 8-9 | 0.9 |  | $^1H$ | NH—C═O |
| 5.5 | 4.7 | 5.0 | $^1H$ | CH═CH |

EXAMPLE 7

Air Drying Nanobinder Based on Si/Ti-core in Alkyd Paint
a) Preparation of Polybranched Organic/Inorganic Hybrid Polymer with Si/Ti-core Butyl glycol (250 g), acetic acid (3.75 g) and titanium tetraisopropoxide (21.98 g) are weighed in a 2-liter flask. The mixture is stirred under inert atmosphere. A mixture of water (3.516 g) and butyl glycol (100 g) is added dropwise to the flask at room temperature. The mixture is stirred for 10 min. A mixture of amine propyl triethoxy silane (50.83 g), phthalic anhydride (0.072 g) and butyl glycol (250 g) is added dropwise to the flask at room temperature. When all amine propyl triethoxy silane has been added (20 min), the mixture is run with good stirring and reflux for 60 min.

b) Preparation of Air Drying Binder with Si/Ti-core. With Soya Fatty Acid and Phthalic Anhydride Polybranched organic/inorganic hybrid polymer (82.34 g) as shown above, dissolved in butyl glycol (dry matter 42%) is loaded in a ½-liter round flask. Xylene (79.61 g) and soya fatty acid (43.98 g) is loaded. Water trap is filled with xylene. The mixture is heated to 150-160° C. under good stirring (200 rpm) and inert atmosphere ($N_2$). The condensation product water is drained off and xylene recirculated to the round flask during the process. At an acid number of 10 mg KOH/g resin, the batch is cooled to under distillation temperature and FSA (7.27 g) is loaded. The mixture is heated again to 150-160° C. At amine number 2-5 mg KOH/g resin, a vacuum (100-150 mbar) is applied, where residual water, xylene and butyl glycol are removed. The final product is diluted in white spirit high flash (96.80 g) before cooling. The final acid number is 29 mg KOH/g resin.

c) Achieved Paint Properties for Nanobinder Prepared in Example 7b

Alkyd resin (26.48 g), white spirit high flash (17.88 g) and Ca-drier (2.40 g) are mixed and set stirring on dissolver. Titanium dioxide (81.36 g), filler (calcium carbonate, 58.68 g) and Bentone (2.04 g) are added to the mixture. Grind the mixture for 10-20 min.

The stirring velocity is reduced, and the following is then loaded: Alkyd resin (134.56 g), the product from pt 7b) (68.15 g), white spirit high flash (64.13 g), cobalt drier 10% (1.28), Zr-drier 18% (1.40 g) and antiskinning agent (1.64 g).

Reference paint is prepared in the same way, where the product from pt 7b) is substituted with alkyd resin, corrected for dry matter.

The paints are applied to glass plates for test of Beck-Koller drying (120 μm wet film thickness) and König pendulum hardness tests (100 μm wet film thickness).

The following results are achieved:

TABLE 8

| Paint | Beck-Koller T1 [h] | Beck-Koller T2 [h] | Beck-Koller T3 [h] | Beck-Koller T4 [h] | König Pendulum 24 hours | König Pendulum 96 hours | König Pendulum 168 hours | König Pendulum 336 hours |
|---|---|---|---|---|---|---|---|---|
| Ex. 7 | 3 | 11 | 14 | 22 | 7 | 7 | 8 | 9 |
| Ref. | 3 | 11 | 17 | 29 | 5 | 5 | 6 | 7 |

EXAMPLE 8

Air Drying Nanobinder Based on Si-core and Fewer Amine Groups in Alkyd Paint a) Preparation of Polybranched Organic/Inorganic Hybrid Polymer with Si-core Prepared from Mixture of Silanes for Fewer Amine Groups Polybranched organic/inorganic hybrid polymer (275.33 g), as given in example 1 and butyl glycol (505 g) are weighed in en 2-liter flask (mixture 1). A mixture of tetraethoxy silane (178.475 g) and butyl glycol (2000 g) is stirred separately (mixture 2). A third mixture of water (34.265 g) and butyl glycol (350 g) is stirred separately (mixture 3). Mixture 1 and mixture 2 are stirred together and heated to 50° C. Mixture 3 is thereafter added dropwise into the flask at room temperature. The mixture is stirred for 10 min. The mixture is thereafter run with good stirring and reflux for 60 min. The distillation products are distilled off, where the pressure is reduced as required.

b) Preparation of Air Drying Binder with Si-core. With Tall Oil Fatty Acid and Phthalic Anhydride Polybranched organic/inorganic hybrid polymer (90.18 g) as shown above, dissolved in butyl glycol (dry matter 50%) is loaded in a ½-liter round flask. Xylene (120.60 g) is then loaded before tall oil fatty acid (26.30 g) is loaded. Water trap is filled with xylene. The mixture is heated to 140-150° C. under good stirring (200 rpm) and inert atmosphere ($N_2$). The condensation product water is drained off and xylene recirculated to the round flask during the process. At an acid number of 10 mg KOH/g resin, the batch is cooled to under distillation temperature and FSA (17.17 g) is loaded. The mixture is heated again to 140-150° C. At amine number 2-8 mg KOH/g resin, a vacuum (100-150 mbar) is applied, where residual water, xylene and butyl glycol are removed. The final product is diluted in white spirit high flash (165.75 g). The final acid number is 21 mg KOH/g resin.

c) Achieved Paint Properties for Nanobinder Prepared in Example 8b)

Alkyd resin (26.48 g), white spirit high flash (17.88 g) and Ca-drier (2.40 g) are mixed and set stirring on dissolver. Titanium dioxide (81.36 g), filler (calcium carbonate, 58.68 g) and Bentone (2.04 g) are added to the mixture. Grind the mixture for 10-20 min.

The stirring velocity is reduced, and the following is then loaded: Alkyd resin (134.56 g), the product from pt 8b) (73.49 g), white spirit high flash (58.79 g), cobalt drier 10% (1.28), Zr-drier 18% (1.40 g) and antiskinning agent (1.64 g).

Reference paint is prepared in the same way, where the product from pt 8b) is substituted with alkyd resin, corrected for dry matter.

The paints are applied to glass plates for test of König pendulum hardness tests (100 μm wet film thickness).

The following results are achieved:

TABLE 9

| Paint | König Pendulum 24 hours | König Pendulum 96 hours | König Pendulum 168 hours | König Pendulum 336 hours |
|---|---|---|---|---|
| Ex. 8 | 6 | 10 | 12 | 15 |
| Ref. | 5 | 5 | 6 | 7 |

EXAMPLE 9

Air Drying Nanobinder Based on Si-core and with Methyl Groups (for Lower Viscosity) in Alkyd Paint a) Preparation of Polybranched Organic/Inorganic Hybrid Polymer with Si-core and Methyl Groups Butyl glycol (800 g) and methyl triethoxy silane (334.3 g) are weighed in a 2-liter flask. The mixture is stirred under inert atmosphere. A mixture of water (101.25 g) and butyl glycol (200 g) is added dropwise to the flask at room temperature. The mixture is stirred for 10 min. The mixture is thereafter run with good stirring and reflux for 60 min. A mixture of amine propyl triethoxy silane (415.05 g), phthalic anhydride (2.56 g) and butyl glycol (800 g) is added dropwise to the flask at room temperature. A mixture of water (101.25 g) and butyl glycol (283 g) is added dropwise to the flask at room temperature. The mixture is stirred for 10 min. and is run with good stirring and reflux for 60 min. The distillation products are distilled off, where the pressure is reduced as required.

b) Preparation of Air Drying Binder with Si-core and Methyl Groups. With Soya Fatty Acid and Phthalic Anhydride Polybranched organic/inorganic hybrid polymer (144.92 g) as shown above, dissolved in butyl glycol (dry matter 34.4%) is loaded in a ½-liter round flask. Xylene (72.85 g) is then loaded before soya fatty acid (69.81 g) is loaded. Water trap is filled with xylene. The mixture is heated to 150-160° C. under good stirring (200 rpm) and inert atmosphere ($N_2$). The condensation product water is drained off and xylene recirculated to the round flask during the process. At an acid number of 10 mg KOH/g resin, the batch is cooled to under distillation temperature and FSA (3.19 g) is loaded. The mixture is heated again to 150-160° C. At amine number 2-8 mg KOH/g resin, a vacuum (100-150 mbar) is applied, where residual water, xylene and butyl glycol are removed. The final product is diluted in white spirit high flash (140.24 g) before cooling. The final acid number is 6 mg KOH/g resin.

c) Achieved Paint Properties for Nanobinder Prepared in Example 9b)

Alkyd resin (26.48 g), white spirit high flash (17.88 g) and Ca-drier (2.40 g) are mixed and set to stirring on dissolver. Titanium dioxide (81.36 g), filler (calcium carbonate, 58.68 g) and Bentone (2.04 g) are added to the mixture. Grind the mixture for 10-20 min.

The stirring velocity is reduced, and the following is then loaded: Alkyd resin (134.56 g), the binder from pt 9b) (62.34 g), white spirit high flash (69.94 g), cobalt drier 10% (1.28), Zr-drier 18% (1.40 g) and antiskinning agent (1.64 g).

Reference paint is prepared in the same way, where the product from pt 9b) is substituted with alkyd resin, corrected for dry matter.

The paints are applied to glass plates for test of König pendulum hardness tests (100 μm wet film thickness). High shear viscosity and dry matter are measured.

The following results are achieved:

TABLE 10

| Paint | ICI C&P viscosity 25° C. [P] | Dry matter in paint [%] | König Pendulum 24 hours | König Pendulum 96 hours | König Pendulum 168 hours | König Pendulum 336 hours |
|---|---|---|---|---|---|---|
| Ex. 8 | 2.9 | 72.5 | 6 | 7 | 10 | 10 |
| Ref. | 2.9 | 73.4 | 6 | 7 | 7 | 7 |

EXAMPLE 10

Air Drying Nanobinder Based on Si-core and with Fewer Amine Groups in Alkyd Paint a) Preparation of Polybranched Organic/Inorganic Hybrid Polymer with Si-core Prepared from Mixture of Silanes for Fewer Amine Groups Polybranched organic/inorganic hybrid polymer (275.33 g), as given in example 1 and butyl glycol (505 g) are weighed in en 2-liter flask (mixture 1). A mixture of tetraethoxy silane (178.475 g) and butyl glycol (2000 g) is stirred separately (mixture 2). A third mixture of water (34.265 g) and butyl glycol (350 g) is stirred separately (mixture 3). Mixture 1 and mixture 2 are stirred together and heated to 50° C. Mixture 3 is thereafter added dropwise into the flask at room temperature. The mixture is stirred for 10 min. The mixture is thereafter run with good stirring and reflux for 60 min. The distillation products are distilled off, where the pressure is reduced as required.

b) Preparation of Air Drying Binder with Si-core and Fewer Amine Groups. With Soya Fatty Acid and Phthalic Anhydride Polybranched organic/inorganic hybrid polymer (110.86 g) as shown above, dissolved in butyl glycol (dry matter 46.2%) is loaded in a ½-liter round flask. Xylene (127.87 g) is then loaded before soya fatty acid (67.46 g) is loaded. Xylene is filled in water trap. The mixture is heated to 140-150° C. under good stirring (200 rpm) and inert atmosphere ($N_2$). The condensation product water is drained off and xylene recirculated to the round flask during the process. At an acid number of 10 mg KOH/g resin, the batch is cooled to under distillation temperature and FSA (11.14 g) is loaded. The mixture is heated again to 140-150° C. At amine number 2-5 mg KOH/g resin, a vacuum (100-150 mbar) is applied, where residual water, xylene and butyl glycol are removed. The final product is diluted in white spirit high flash (182.67 g). The final acid number is 18 mg KOH/g resin.

c) Achieved Paint Properties for Nanobinder Prepared in Example 10b)

Alkyd resin (26.48 g), white spirit high flash (17.88 g) and Ca-drier (2.40 g) are mixed and set stirring on dissolver. Titanium dioxide (81.36 g), filler (calcium carbonate, 58.68 g) and Bentone (2.04 g) are added to the mixture. Grind the mixture for 10-20 min.

The stirring velocity is reduced, and the following are then loaded: Alkyd resin (134.56 g), the product from pt 10b) (82.15 g), white spirit high flash (50.13 g), cobalt drier 10% (1.28), Zr-drier 18% (1.40 g) and antiskinning agent (1.64 g).

Reference paint is prepared in the same way, where the product from pt 10b) is substituted with alkyd resin, corrected for dry matter.

The paints are applied to glass plates for test of König pendulum hardness tests (100 μm wet film thickness).

The following results are achieved:

TABLE 11

| Paint | König Pendulum 24 hours | König Pendulum 96 hours | König Pendulum 168 hours | König Pendulum 336 hours |
|---|---|---|---|---|
| Ex. 10 | 6 | 7 | 8 | 10 |
| Ref. | 5 | 5 | 6 | 7 |

EXAMPLE 11

Air Drying Nanobinder Based on Al/Si-core in Alkyd Paint a) Preparation of Polybranched Organic/Inorganic Hybrid Polymer with Si/Al-core Butyl glycol (250 g) and aluminum di(sec-butoxide)-acetoacetic ester chelate (150.50 g) are weighed in a 2-liter flask. The mixture is stirred under inert atmosphere. A mixture of water (27 g) and butyl glycol (500 g) is added dropwise into the flask in 18 min. at room temperature. The mixture is stirred for 10 min. A mixture of amine propyl triethoxy silane (110.685 g), phthalic anhydride (0.166 g) and butyl glycol (1000 g) is added dropwise to the flask at room temperature. When all amine propyl triethoxy silane has been added (20 min), the mixture is run with good stirring and reflux for 60 min.

The thermostat is set to 160° C. The distillation products are distilled off, where the pressure is reduced as required. The distillation is terminated at 160° C. and less than 1 drop distillate per second (20-50 mbar).

b) Preparation of Air Drying Binder with Si/Al-core. With Soya Fatty Acid.

Polybranched organic/inorganic hybrid polymer (254.17 g) as shown above, dissolved in butyl glycol (dry matter 32.3%) is loaded in a ½-liter round flask. Xylene (62.66 g) is then loaded before soya fatty acid (24.14 g) is loaded. Xylene is filled in water trap. The mixture is heated to 150-160° C. under good stirring (200 rpm) and inert atmosphere ($N_2$). The condensation product water is drained off and xylene recirculated to the round flask during the process. At amine number 2-5 mg KOH/g resin, a vacuum (100-150 mbar) is applied, where residual water, xylene and butyl glycol are removed. The final product is diluted in white spirit high flash (107.04 g). The final acid number is 30 mg KOH/g resin.

c) Achieved Paint Properties for Nanobinder Prepared in Example 11b)

Alkyd resin (26.48 g), white spirit high flash (17.88 g) and Ca-drier (2.40 g) are mixed and set stirring on dissolver. Titanium dioxide (81.36 g), filler (calcium carbonate, 58.68 g) and Bentone (2.04 g) are added to the mixture. Grind the mixture for 10-20 min.

The stirring velocity is reduced, and the following are then loaded: Alkyd resin (134.56 g), the product from pt 11b) (62.08 g), white spirit high flash (70.20 g), cobalt drier 10% (1.28), Zr-drier 18% (1.40 g) and antiskinning agent (1.64 g).

Reference paint is prepared in the same way, where the product from pt 11b) is substituted with alkyd resin, corrected for dry matter.

The paints are applied to glass plates for test of Beck-Koller drying (120 μm wet film thickness) and König pendulum hardness tests (100 μm wet film thickness).

The following results are achieved:

TABLE 12

| Paint | Beck-Koller T1 [h] | Beck-Koller T2 [h] | Beck-Koller T3 [h] | Beck-Koller T4 [h] | König Pendulum 24 hours | König Pendulum 96 hours | König Pendulum 168 hours | König Pendulum 336 hours |
|---|---|---|---|---|---|---|---|---|
| Ex. 11 | 2.5 | 5 | 5.5 | 13 | 10 | 11 | 13 | 15 |
| Ref. | 2.5 | 11.5 | 19 | >48 | 6 | 7 | 7 | 7 |

EXAMPLE 12

Air Drying Nanobinder Based on Al/Si-core in Alkyd Paint
a) Preparation of Polybranched Organic/Inorganic Hybrid Polymer with Al/Si-core Butyl glycol (600 g) and aluminum di(sec-butoxide)-acetoacetic ester chelate (135.90 g) are weighed in en 2-liter flask. The mixture is stirred under inert atmosphere. A mixture of water (16.2 g) and butyl glycol (300 g) is added dropwise to the flask in 18 min. at room temperature. The mixture is stirred for 10 min. A mixture of amine propyl triethoxy silane (33.206 g), phthalic anhydride (0.18 g) and butyl glycol (600 g) is added dropwise into the flask at room temperature. When all amine propyl triethoxy silane has been added (20 min), the mixture is run with good stirring and reflux for 60 min.

Set the thermostat to 160° C. The distillation products are distilled off, where the pressure is reduced as required. The distillation is terminated at 160° C. and less than 1 drop distillate per second (20-50 mbar).

b) Preparation of Air Drying Binder with Al/Si-core. With Soya Fatty Acid.

Polybranched organic/inorganic hybrid polymer (165.90 g) as shown above, dissolved in butyl glycol (dry matter 51.8%) is loaded in a ½-liter round flask. Xylene (65.60 g) is then loaded before soya fatty acid (6.42 g) is loaded. Xylene is filled in water trap. The mixture is heated to 150-155° C. under good stirring (200 rpm) and inert atmosphere ($N_2$). The condensation product water is drained off and xylene recirculated to the round flask during the process. At amine number 2-10 mg KOH/g resin, a vacuum (100-150 mbar) is applied, where residual water, xylene and butyl glycol are removed. The final product is diluted in white spirit high flash (112.07 g) before cooling. The final acid number is 6 mg KOH/g resin.

c) Achieved Paint Properties for Nanobinder Prepared in Example 12b)

Alkyd resin (26.48 g), white spirit high flash (17.88 g) and Ca-drier (2.40 g) are mixed and set to stirring on dissolver. Titanium dioxide (81.36 g), filler (calcium carbonate, 58.68 g) and Bentone (2.04 g) are added to the mixture. Grind the mixture for 10-20 min.

The stirring velocity is reduced, and the following are then loaded: Alkyd resin (134.56 g), the product from pt 12b) (63.12 g), white spirit high flash (69.16 g), cobalt drier 10% (1.28), Zr-drier 18% (1.40 g) and antiskinning agent (1.64 g).

Reference paint is prepared in the same way, where the product from pt 12b) is substituted with alkyd resin, corrected for dry matter.

The paints are applied to glass plates for test of Beck-Koller drying (120 μm wet film thickness) and König pendulum hardness tests (100 μm wet film thickness).

The following results are achieved:

TABLE 13

| Paint | Beck-Koller T1 [h] | Beck-Koller T2 [h] | Beck-Koller T3 [h] | König Pendulum 24 hours | König Pendulum 96 hours | König Pendulum 168 hours | König Pendulum 336 hours |
|---|---|---|---|---|---|---|---|
| Ex. 12 | 3 | 7.5 | 9.5 | 11 | 14 | 15 | 17 |
| Ref. | 2.5 | 11.5 | 19 | 6 | 7 | 7 | 7 |

EXAMPLE 13

Air Drying Nanobinder Based on Zr/Si-core in Alkyd Paint
a) Preparation of Polybranched Organic/Inorganic Hybrid Polymer with Zr/Al-core Butyl glycol (800 g), acetic acid (23.75 g) and zirconium isopropoxide (280.78 g) are weighed in en 2-liter flask. The mixture is stirred under inert atmosphere. A mixture of water (22.68 g) and butyl glycol (400 g) is added dropwise into the flask in 18 min. at room temperature. The mixture is stirred for 10 min. A mixture of amine propyl triethoxy silane (44.274 g), phthalic anhydride (0.066 g) and butyl glycol (800 g) is added dropwise to the flask at room temperature. When all amine propyl triethoxy silane has been added (20 min), the mixture is run with good stirring and reflux for 60 min.

b) Preparation of Air Drying Binder with Zr/Al-core. With Soya Fatty Acid

Polybranched organic/inorganic hybrid polymer (196.02 g) as shown above, dissolved in butyl glycol (dry matter 27.2%) is loaded in a ½-liter round flask. Xylene (48.32 g) is then loaded before soya fatty acid (47.01 g) is loaded. Xylene is filled in water trap. The mixture is heated to 155-160° C. under good stirring (200 rpm) and inert atmosphere ($N_2$). The condensation product water is drained off and xylene recirculated to the round flask during the process. At amine number 2-7 mg KOH/g resin, a vacuum (100-150 mbar) is applied, where residual water, xylene and butyl glycol are removed. The final product is diluted in white spirit high flash (130.87 g). The final acid number is 48 mg KOH/g resin.

c) Achieved Paint Properties for Nanobinder Prepared in Example 13b)

Alkyd resin (26.48 g), white spirit high flash (17.88 g) and Ca-drier (2.40 g) are mixed and set stirring on dissolver. Titanium dioxide (81.36 g), filler (calcium carbonate, 58.68 g) and Bentone (2.04 g) are added to the mixture. Grind the mixture for 10-20 min.

The stirring velocity is reduced, and the following are then loaded: Alkyd resin (134.56 g), the product from pt 13b) (69.89 g), white spirit high flash (62.39 g), cobalt drier 10% (1.28), Zr-drier 18% (1.40 g) and antiskinning agent (1.64 g).

Reference paint is prepared in the same way, where the product from pt 13b) is substituted with alkyd resin, corrected for dry matter.

The paints are applied to glass plates for test of Beck-Koller drying (120 μm wet film thickness) and König pendulum hardness tests (100 μm wet film thickness).

The following results are achieved:

TABLE 14

| Paint | König Pendulum 24 hours | König Pendulum 96 hours | König Pendulum 168 hours | König Pendulum 336 hours |
|---|---|---|---|---|
| Ex. 13 | 11 | 9 | 9 | 9 |
| Ref. | 5 | 5 | 6 | 7 |

EXAMPLE 14 a) Preparation of Nanobinder which is Water Dilutable

Polybranched organic/inorganic hybrid polymer, as given in example 1, is loaded in a ½-liter round flask (110.59 g). This is dissolved in xylene and ethanol in ratio 1:1 (dry matter 45.98%). Xylene (129.03 g) and soya fatty acid (57.05 g) are loaded. Xylene is filled in water trap after ethanol is distilled off. The mixture is heated to 140-145° C. under good stirring (200 rpm) and inert atmosphere ($N_2$). The condensation product water is drained off and xylene recirculated to the round flask during the process. At acid number >10 mg KOH/g resin FSA (23.56 g) is loaded. The solution is heated to 145-150° C. At an acid number of ca. 5, a vacuum (100-150 mbar) is applied in order to pull off xylene and condensation water from the process. TMA is loaded (7.22 g) at 125° C., and the solution is further heated to 130° C. 20 min after TMA is dissolved, the mixture is cooled.

The final acid number is 28 mg KOH/g resin.

b) The binder (10 g) from pt 14a) is diluted to 60% dry matter in butyl glycol. Ammonia (0.2 g, 25%-solution) and water (3.8 g) are stirred in. The solution is clear.

EXAMPLE 15

Determination of Particle Size Distribution for Air Drying Nanobinder Based on Si-core a) Preparation of Polybranched Organic/Inorganic Hybrid Polymer with Si-core and Fewer Amine Groups Polybranched organic/inorganic hybrid polymer (758.89 g), as given in example 1 and butyl glycol (450 g) are weighed in a 2-liter flask (mixture 1). A mixture of tetraethoxy silane (164.32 g) and butyl glycol (550 g) is stirred separately (mixture 2). A third mixture of water (62.86 g) and butyl glycol (720.66 g) is stirred separately (mixture 3). Mixture 1 and mixture 2 are stirred together and heated to 50° C. Mixture 3 is thereafter added dropwise into the flask at room temperature. The mixture is stirred for 10 min. The mixture is thereafter run with good stirring and reflux for 60 min. The distillation products are distilled off, where the pressure is reduced as required.

b) Preparation of Air Drying Binder with Si-core. With Soya Fatty Acid and Phthalic Anhydride.

Polybranched organic/inorganic hybrid polymer (40.77 g) as shown above, dissolved in butyl glycol (dry matter 68.35%) is loaded in a ½-liter round flask. Xylene (159.58 g) is then loaded before soya fatty acid (35.19 g) is loaded. Xylene is filled in water trap. The mixture is heated to 140-150° C. under good stirring (200 rpm) and inert atmosphere ($N_2$). The condensation product water is drained off and xylene recirculated to the round flask during the process. At an acid number of 10 mg KOH/g resin, the batch is cooled to under distillation temperature and FSA (5.94 g) is loaded. The mixture is again heated to 140-150° C. At amine number 2-5 mg KOH/g resin, a vacuum (100-150 mbar) is applied, where residual water, xylene and butyl glycol are removed. The final product is diluted in white spirit high flash (178.53 g. The final acid number is 9 mg KOH/g resin.

c) The particle size and size distribution were determined by using light scattering method (Zetasizer DTS5300, Malvern Instruments Ltd, England). FIG. 1 shows the particle size distribution for polybranched organic/inorganic hybrid polymer, prepared in example 15a, where the sample is analysed 3 times. The average particle size is 14 nm. FIG. 2 shows the particle size distribution for binder dispersion prepared in example 15b (10 weight-% in THF) where the sample is analysed 3 times. The average particle size is 35 nm.

The invention claimed is:

1. A binder for air drying paint, based on metal oxide-containing nanoparticles with unsaturated organic branches, the binder comprising:
   at least one metal atom of the nanoparticle chemically bound to an organic branch with at least an unsaturated ethylenic functionality,
   wherein the binder includes the following chemical substructure:

$$O_{1.5}Si-(CH_2)_p-NH-C(O)-(CH_2)_q-(CH=CH)_x-(CH_2)_r-(CH=CH-CH_2)_y-(CH_2)_s-(CH=CH)_z-(CH_2)_t-CH_3$$

where p is an integer from 1 to 24
q, r, s, and t are each an integer from 0 to 21
x and z are each an integer from 0 to 4 and
y is an integer from 0 to 6
and wherein oxygen atoms of the $O_{1.5}Si-$ are bound to metal atoms.

2. The binder according to claim 1, wherein metal oxide and organic branch are linked to each other with hydrolysis-stable covalent chemical bonds.

3. The binder according to claim 1, wherein the metal atom of the metal oxide-containing nanoparticles is selected from the group consisting of Si, Al, Zr, Ce, Zn, Sn, Fe and Ti.

4. The binder according to claim 1, wherein the binder is soluble or dispersible in water.

5. The binder according to claim 1, wherein the binder is present in a mixture with particles selected from the group consisting of metal oxide particles, organic pigments and fillers.

6. The binder according to claim 5, wherein the particles have a diameter between 5 nm and 1000 nm.

7. The binder according to claim 6, wherein the metal oxide particles are selected from the group consisting of silicon oxide, aluminum oxide, titanium oxide, zirconium oxide and iron oxide.

8. A process for preparation of a binder, the process comprising:
   preparing a polybranched organic/inorganic hybrid polymer when hydrolyzable metal compounds with functional amine groups are converted through hydrolysis and condensation; and
   reacting at least one of said functional amine groups with at least one unsaturated organic compound so that a covalent chemical bond or ionic bond is formed, between the N-atom of the functional amine group and at least one atom of the unsaturated organic compound.

9. The process according to claim 8, wherein the unsaturated organic compound is selected from the group consisting of unsaturated fatty acids and ester derivatives of unsaturated fatty acids.

10. The process according to claim 8, wherein the hydrolyzable metal compound with functional amine groups is selected from the group consisting of 3-amine propyl triethoxy silane and 3-amine propyl trimethoxy silane.

11. The process according to claim 8, further comprising:
    reacting hydrolysable metal compounds without functional amine groups, in addition to hydrolysable metal compounds with functional amine groups.

12. The process according to claim 11, wherein the hydrolysable metal compounds without functional amine groups are selected from the group consisting of alkoxides and carboxylates of silicon, aluminum, titanium and zirconium.

13. The process according to claim 8, further comprising: reacting at least one silane with the following composition:

$$(Z-)_m Si(-Y)_{4-n-m}$$

where n is an integer from 0 to 2,
m is an integer from 1 to 3,
Y is selected from the group consisting of alkoxy, carboxyl and halogen, and
Z is selected from the group consisting of hydrogen, alkyl, aryl, substituted alkyl, substituted aryl.

14. The process according to claim 8, wherein the functional amine groups are reacted with organic compounds selected from the group consisting of anhydrides, epoxy compounds, esters, saturated organic acids, sulphonic acids and hydroxy acids in addition to the unsaturated organic compounds.

15. The process according to claim 14, wherein the organic compound is at least one cyclic anhydride, and amide structures resulting from reaction with the cyclic anhydride, are deprotonated and thereby ionized with bases or alkaline compounds.

16. The process according to claim 15, wherein the cyclic anhydride is phthalic anhydride.

17. The process according to claim 8, wherein the organic compound has at least one functional carboxylic acid group, which after the reaction is deprotonated and thereby ionised with bases or alkaline compounds.

18. The process according to claim 17, wherein the organic compound is trimellitic anhydride.

19. An air drying paint or lacquer, comprising:
at least one binder comprising
at least one metal atom of the nanoparticle chemically bound to an organic branch with at least an unsaturated ethylenic functionality,
wherein the binder includes the following chemical substructure:

$$O_{1.5}Si-(CH_2)_p-NH-C(O)-(CH_2)_q-(CH=CH)_x\\-(CH_2)_r-(CH=CH-CH_2)_y-(CH_2)_s-\\(CH=CH)_z-(CH_2)_t-CH_3$$

where p is an integer from 1 to 24
q, r, s, and t are each an integer from 0 to 21
x and z are each an integer from 0 to 4 and
y is an integer from 0 to 6
and wherein oxygen atoms of the $O_{1.5}Si-$ are bound to metal atoms.

20. The air drying paint or lacquer according to claim 19, further comprising:
at least one other binder.

21. The air drying paint or lacquer according to claim 20, the at least one or other binder is chosen among alkyd, fatty acid modified polyester, fatty acid modified polyurethane, linoil, urethane modified alkyd, allylfunctional acryl or fatty acid modified acryl.

22. The air drying paint or lacquer according to claim 19, wherein the paint/lacquer comprises 1-90 weight percent binder.

23. The air drying paint or lacquer according to claim 19, wherein the paint is selected from the group consisting of polyamide thixotropic alkyd paint and polyurethane thixotropic alkyd paint.

24. The air drying paint or lacquer according to claim 8, wherein the paint is applied to the surface of a substrate.

* * * * *